United States Patent [19]

Sandstrom et al.

[11] Patent Number: 5,386,865
[45] Date of Patent: Feb. 7, 1995

[54] TIRE WITH RUBBER SIDEWALL

[75] Inventors: Paul H. Sandstrom, Tallmadge; Thomas J. Segatta, Fairlawn; Johnny D. Massie, II, Hudson, all of Ohio

[73] Assignee: The Goodyear Tire & Rubber Company, Akron, Ohio

[21] Appl. No.: 779,668

[22] Filed: Oct. 21, 1991

[51] Int. Cl.6 .......................... C08L 9/00; C08L 7/00; B60C 13/00
[52] U.S. Cl. .................................... 152/525; 525/236; 525/237; 525/192
[58] Field of Search ...................... 525/236, 237, 192; 152/525, 450

[56] References Cited

U.S. PATENT DOCUMENTS

| 3,166,609 | 1/1965 | Wilder | 525/236 |
| 3,830,274 | 8/1974 | Waser | 525/211 |
| 4,310,582 | 1/1982 | Stumpe | 525/236 |
| 4,510,291 | 4/1985 | Kawakami | 525/237 |

FOREIGN PATENT DOCUMENTS

| 870053 | 5/1971 | Canada . |
| 60-197749 | 10/1985 | Japan . |
| 01242642 | 9/1989 | Japan . |
| 02308833 | 12/1990 | Japan . |

OTHER PUBLICATIONS

McPherson et al–Engineering Uses of Rubber–Feb. 1960 Reinhold Pub. Corp.–p. 293.

Primary Examiner—Carman J. Seccuro, Jr.
Attorney, Agent, or Firm—Henry C. Young, Jr.

[57] ABSTRACT

A pneumatic rubber tire having a rubber sidewall composition containing trans 1,4-polybutadiene rubber and at least one additional rubber.

1 Claim, No Drawings

TIRE WITH RUBBER SIDEWALL

FIELD

This invention relates to a pneumatic rubber tire having a rubber sidewall composition. More specifically, the invention relates to such a tire having a rubber sidewall composition of a rubber blend containing trans 1,4-polybutadiene rubber.

BACKGROUND

Pneumatic rubber tires conventionally have ÷Xrubber sidewalls which may be subject to considerable flexing and scuffing Sidewalls of rubber tires may age somewhat prematurely as a result of (i) weathering due to atmospheric conditions, (ii) fatigue cracking due to continual flexing under operating conditions, and (iii) abrasion due to scuffing.

Rubber sidewall ageing due to weathering may be, for example, a result of exposure to ultraviolet light, ozone and high humidity. Antidegradants are conventionally mixed with the sidewall rubber to counteract such effects. Also, often low unsaturation rubbers such as butyl rubber and EPDM's are included in or mixed with the sidewall rubber for such purpose.

Fatigue cracking of the sidewall rubber is usually due to continual flexing of the tire sidewall as the tire is run under load at service conditions. Such cracking can first initiate and then can propagate, over time, sometimes to an extent that it penetrates deeper into the tire sidewall and, in some cases, may even penetrate the supporting carcass plies. Typically, cis 1,4-polybutadiene rubber is included in the sidewall rubber for a purpose of retarding such cracking.

Tire sidewalls may also prematurely are, or wear, due to scuffing against road curbs or other objects. Rubber is thereby abraded away and a roughened surface results. Excessive scuffing can potentially remove enough rubber so that the underlying and supporting tire carcass may be subject to degradive influences. Often cis 1,4-polybutadiene rubber is included in the sidewall rubber composition to aid in resisting abrasion due to scuffing.

Further, where a tire may be utilized, for example, in an off-the-road service, such as in mine operations and in logging operations, where the tire is run over rough terrain, growth of a crack, or cut, in the sidewall is a consideration. Often a combination of cis 1,4-polybutadiene and natural rubber is used in the sidewall rubber combination to retard cut growth.

A consideration of using trans 1,4-polybutadiene rubber in a tire sidewall composition was made. While utilization of trans 1,4-polybutadiene has been suggested for use in tire treads, (for example, see Japanese Patent Publication Nos. 60-113,036; 62-101,504 and 61-143,453 and U.S. Pat. Nos. 4,510,291 and 5,025,059) utilization of the rubber in a tire sidewall component appears to be novel and the results thereof are believed to be somewhat speculative without evaluation.

DISCLOSURE AND PRACTICE OF THE INVENTION

In accordance with this invention, a pneumatic rubber tire is provided having a rubber sidewall where said outer sidewall layer is a sulfur cured rubber layer composition comprised of, based on 100 parts by weight rubber (phr), either (A) rubber components composed of (i) about 30 to about 70, preferably about 40 to about 60, parts by weight of trans 1,4-polybutadiene rubber and, correspondingly, (ii) about 70 to about 30, preferably about 60 to about 40, parts by weight of at least one additional rubber; or (B) rubber components composed of (i) about 5 to about 10 parts by weight trans 1,4-polybutadiene rubber and, correspondingly, about 95 to about 90 parts by weight of at least one additional rubber; wherein said trans 1,4-polybutadiene rubber is characterized by having at least a 70 percent trans 1,4-content; and wherein said additional rubber is selected from at least one of natural and/or synthetic cis 1,4-polyisoprene rubber, cis 1,4-polybutadiene rubber, styrene/butadiene copolymer rubber, styrene/isoprene/butadiene terpolymer rubber and 3 4-polyisoprene rubber.

Thus, the (A) variation of the rubber portion of the sidewall layer contains a substantial amount of trans 1,4-polybutadiene, and the (B) variation contains a minimal amount of trans 1,4-polybutadiene.

The (A) variation of the rubber portion of the sidewall layer is designed to enhance flex fatigue resistance and tear initiation properties (increase resistance to flex fatigue and reduce tear initiation). This is because of contribution of significant amounts of trans 1,4-polybutadiene.

The (B) variation of the rubber portion of the sidewall layer is designed to increase cut growth resistance. This is because it is believed, although the complete mechanism may not be thoroughly understood, the small crystalline domains of trans 1,4-polybutadiene deflect the crack tip (the leading edge of the growing crack).

In view of the considered uniqueness of the (A) and (B) variations in the rubber portion of the sidewall, it is contemplated that the invention also includes the (A) and (B) sulfur cured rubber compositions themselves.

Preferably, such trans 1,4-polybutadene is characterized by having about 75 to about an 85 percent of its butadiene repeat units of e trans 1,4-isomeric structure, about 2 to about 18 percent of its units of a 1,2-structure and about 2 to about 18 percent of its units of a cis 1,4-structure and, in its uncured state, and typically at least one melting point in a range of 35° C. to about 60° C. A first major melting point in the range of about 35° C. to about 45° C. and a second minor melting point in the range of about 55° C. to about 65° C. might be observed.

For the purposes of this description, the "compounded" rubber compositions refer to the respective rubber compositions which have been compounded with appropriate compounding ingredients such as, for example, carbon black, oil, stearic acid, zinc oxide, silica, wax, antidegradants, resin(s), sulfur and accelerator(s).

The trans 1,4-polybutadiene utilized by this invention might be prepared, for example, by anionic polymerization by batch or continuous polymerization of 1,3-butadiene in an organic solvent and in the presence of cobalt octoate and triethyl aluminum as a catalyst system with a para alkyl substituted phenol as a catalyst modifier.

In the practice of this invention, the sidewall rubber composition may be comprised of at least one rubber selected, for example, from cis 1,4-polyisoprene rubber, natural or synthetic, 3,4-polyisoprene rubber, styrene/butadiene copolymer rubbers, styrene/isoprene/butadiene terpolymer rubbers, and cis 1,4-polybutadiene rubber. Preferably it is comprised of a combination of natural rubber or cis 1,4-polyisoprene rubber and cis 1,4-polybutadiene rubbers. It may also be comprised of or contain butyl, halobutyl and/or EPDM rubber.

It is readily understood by those having skill in the art that the rubber compositions of the sidewall would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical additions of carbon black may comprise about 20 to 80 parts by weight per 100 parts by weight of diene rubber (phr), preferably 30 to 50 phr. Typical amounts of tackifier resins, if used, may comprise about 0.5 to about 10 phr, usually about 1 to about 5 phr. Typical amounts of processing aids may comprise 1 to 20 phr. Such processing aids can include, for example, aromatic, napthenic, and/or paraffinic processing oils. Silica, if used, may be used in an amount of about 5 to about 25 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344-346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of specified blends of rubbers in tire sidewalls as sulfur vulcanizable compositions.

The vulcanization is conducted in the presence of a sulfur vulcanizing agent. Examples of Suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. AS known to those skilled in the art, sulfur vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment combinations of two or more accelerators which the primary accelerator is generally used in the larger amount (0.5 to 2 phr), and a secondary accelerator which is generally used in smaller amounts (0.05-0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the utilization of specified blends of rubbers in $\leq$6Xtire sidewalls, particularly the inclusion of the trans polybutadiene in the sidewalls.

Sometimes, the combination of zinc oxide, fatty acid, sulfur and accelerator(s) may be collectively referred to as curatives.

Sometimes a combination of antioxidants, antiozonants and waxes may be collectively referred to as antidegradants.

The tire can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Mixtures of diene rubbers with relatively small amounts of trans 1,4-polybutadiene having two softening points of about 40° C. and 60° C. were prepared comprised of the following recipe shown in Table 1 as Experiments A, B and C. Experiment A is Considered a control.

Thus, this Example refers to variation (B) of this invention.

TABLE 1

| Material | Parts Exp A (Control) | Parts Exp B | Parts Exp C |
|---|---|---|---|
| Natural rubber | 50 | 50 | 50 |
| Cis 1,4-polybutadiene | 50 | 41 | 35 |
| Trans 1,4-polybutadiene[1] | 0 | 9 | 15 |
| Carbon black (Low structure) | 45 | 45 | 45 |
| Processing oil (aromatic) | 6 | 6 | 6 |
| Antidegradants | 6.5 | 6.5 | 6.5 |
| Curatives | 8.7 | 8.7 | 8.7 |

Conventional, preferred, typical, amounts of antidegradant(s) (para-phenylene diamine type), as well as fatty acid (stearic acid) zinc oxide, sulfur and accelerator of the sulfenamide type (curatives) were used.
[1]A trans 1,4-polybutadiene for this invention characterized by high trans 1,4-polybutadiene content (80 percent trans 1,4-).

The trans 1,4-polybutadiene for this example was characterized by having a trans 1,4-content of about 80 percent, a cis 1,4-content of about 5 percent and a vinyl 1,2-content of about 15 percent. It was further characterized by having a number average molecular weight (Mn) of about 205,000 and a weight average molecular weight (Mw) of about 430,000. It was additionally characterized by having a Tg of about −75° C. and melting points (Tm) of 40° C. (major) and 60° C. (minor). (Both the Tg and Tm were determined by differential scanning calorimeter at 10° C. per minute).

Such trans 1,4-polybutadiene can be suitably prepared by batch polymerizing 1,3-butadiene in an aliphatic hydrocarbon solution (e.g. hexane) in the presence of a catalyst of cobalt octoate and triethylaluminum with p-dodecylphenol modifier, although it can also be prepared by continuous polymerization with a suitable gel inhibitor.

EXAMPLE II

The prepared rubber compositions were cured at a temperature of about 150° C. for about 36 minutes and the resulting cured rubber samples evaluated for their physical properties as shown in the following Table 2. The experimental samples A, B and C correspond to the experimental samples A, B and C of Example I.

TABLE 2

| Properties | Exp A (Control) | Exp B | Exp C |
|---|---|---|---|
| Rheometer[1] (150° C.) | | | |
| (a) Min torque (dN-m) | 9.2 | 9.9 | 10.0 |
| (b) Max torque (dN-m) | 36.5 | 37.0 | 37.4 |
| Stress-Strain | | | |
| (a) 300% Modulus (MPa) | 7.9 | 8.5 | 7.7 |
| (b) Tensile strength (MPa) | 16.9 | 16.5 | 17.5 |
| (c) Elongation (%) | 545 | 514 | 557 |
| Tear[2] (N/cm) (strebler at 95° C.) | 217 | 211 | 235 |
| Flex-to-fail[3] (cycles) | 44,250 | 50,600 | 41,000 |
| Cut growth[4] (dc/dN) (M/cycle) (25% strain) | $9 \times 10^{-8}$ | $2 \times 10^{-8}$ | $6.5 \times 10^{-8}$ |

[1]Torque applied by an oscillating disk to uncured rubber samples which cures during the test.
[2]Force required to pull apart 5 mm wide strips (180° pull) a measure of adherence to itself.
[3]Dynamic test performed on dumbbell cured rubber samples by continuous flexing at about one Hertz.
[4]Cut growth test described in Rubber Chem and Tech, Sept–Oct, 1990, Volume 63, No. 4, pages 567–581 with reference to FIG. 2 (pure shear), page 569.

Thus, the properties of the cured rubber compositions B and C are comparable to the Control Exp. A, except that the cut growth is substantially improved (lower), making the 1,4-polybutadiene an excellent candidate for tire sidewall application.

Although the mechanism may not be completely understood, it is believed that the improved cut growth resistance is due to the strain crystallization of the trans 1,4-polybutadiene which deflects the crack tip.

EXAMPLE III

Mixtures of diene rubbers with high amounts of trans 1,4-polybutadiene having two softening points of about 40° C. and about 60° C. were prepared comprised of the recipes shown in Table 3 as Experiments D-G. Experiments D and F are considered controls.

Thus, this Example relates to variation (A) of this invention.

TABLE 3

| Material | Parts Exp D (Control) | Parts Exp E | Parts Exp F (Control) | Parts Exp G |
|---|---|---|---|---|
| Natural rubber | 40 | 40 | 40 | 40 |
| Cis 1,4-polybutadiene | 60 | 0 | 60 | 0 |
| Trans 1,4-polybutadiene[1] | 0 | 60 | 0 | 60 |
| Carbon black (low reinforcing) | 50 | 50 | 50 | 50 |
| Processing oil and tackifier resin | 15 | 15 | 15 | 15 |
| Antidegradants | 5.5 | 5.5 | 5.5 | 5.5 |
| Curatives | 6.8 | 6.8 | 6.3 | 6.5 |

Conventional, preferred, typical amounts of antidegradant(s) (para-phenylene diamine type), as well as tackifying resin, fatty acid, wax, zinc oxide, peptizer, sulfur and accelerator of the sulfenamide type (curatives) were used.
[1]A trans 1,4-polybutadiene for this invention characterized by high trans 1,4-polybutadiene content (80 percent trans 1,4-).

EXAMPLE IV

The prepared rubber compositions of Example III were cured at a temperature of about 150° C. for about 20 minutes and the resulting cured rubber samples evaluated for their physical properties as shown in the following Table 2.

TABLE 4

| Materials | Exp D (Control) | Exp E | Exp F | Exp G |
|---|---|---|---|---|
| Rheometer (150° C.) | | | | |
| (a) Min. torque (dN-m) | 2.2 | 2.4 | 2.3 | 2.5 |
| (b) Max. torque (dN-m) | 13.9 | 12.9 | 12.4 | 12.8 |
| Stress-strain | | | | |
| (a) 300% modulus (MPa) | 6.0 | 4.9 | 5.6 | 5.5 |
| (b) Tensile strength (MPa) | 14.2 | 15.0 | 15.0 | 15.3 |
| (c) Elongation (%) | 623 | 745 | 652 | 683 |
| Tear strength (N/cm) | 187 | 403 | 274 | 376 |
| Flex-to fail (23° C.) (cycles) (144% strain) | 73,300 | 139,000 | 91,800 | 136,200 |

Observation of the physical properties of the rubber composite demonstrate improvements in tear strength (tear initiation) and flex fatigue resistance. This is demonstrated even with equivalent 300% modulus values.

While certain representative embodiments and details have been shown for the purpose of illustrating the invention, it will be apparent to those skilled in this art that various charges and modifications may be made therein without departing from the spirit or scope of the invention.

What is claimed is:

1. A pneumatic rubber tire having an outer rubber sidewall layer where said outer layer is comprised of, based on 100 pans by weight rubber, (i) about 5 to about 10 parts by weight of a trans 1,4-polybutadiene rubber and, correspondingly about 95 to about 90 parts by weight of at least one additional rubber; wherein said trans 1,4-polybutadiene rubber is characterized by having 75 to 85 percent trans 1,4-content, a molecular weight (Mn) of about 205,000 and prepared by polymerizing 1,3-butadiene in an organic solvent in the presence of a catalyst of cobalt octoate and triethylaluminum with p-dodecylphenol modifier; and wherein said additional rubber is selected from at least one of natural rubber and/or synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber.

* * * * *